United States Patent
Long

(10) Patent No.: US 12,101,025 B2
(45) Date of Patent: Sep. 24, 2024

(54) SWITCHED-MODE POWER SUPPLY, POWER SUPPLY CIRCUIT THEREOF, AND POWER SUPPLY METHOD

(71) Applicant: Joulwatt Technology Co., Ltd., Hangzhou (CN)

(72) Inventor: Hao Long, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 227 days.

(21) Appl. No.: 17/978,912

(22) Filed: Nov. 1, 2022

(65) Prior Publication Data
US 2023/0143637 A1    May 11, 2023

(30) Foreign Application Priority Data
Nov. 1, 2021   (CN) .......................... 202111283870.0

(51) Int. Cl.
  *H02M 3/156*   (2006.01)
  *H02M 1/00*    (2007.01)
  *H02M 3/158*   (2006.01)

(52) U.S. Cl.
  CPC ......... *H02M 3/156* (2013.01); *H02M 1/0006* (2021.05); *H02M 1/0045* (2021.05); *H02M 1/0054* (2021.05); *H02M 3/1582* (2013.01)

(58) Field of Classification Search
  CPC .......................... H02M 1/0006; H02M 3/156
  See application file for complete search history.

(56) References Cited

U.S. PATENT DOCUMENTS

| | | | |
|---|---|---|---|
| 10,298,129 B1 * | 5/2019 | Xu | H02M 3/156 |
| 2005/0242787 A1 * | 11/2005 | Shirokoshi | H02M 3/1588 323/222 |
| 2021/0057987 A1 * | 2/2021 | Chen | H02M 3/33576 |

* cited by examiner

*Primary Examiner* — Jue Zhang
(74) *Attorney, Agent, or Firm* — Bayramoglu Law Offices LLC

(57) ABSTRACT

A switched-mode power supply includes a first switch transistor. A drain of the first switch transistor receives an input voltage on a direct current input bus of the switched-mode power supply, and a source is connected to a reference ground. The power supply circuit includes a junction field-effect transistor (JFET), where a drain of the JFET receives the input voltage, a gate is connected to the reference ground, and a source outputs a supply voltage or a supply current. During each switch cycle, the first switch transistor is controlled to be turned off or a drain voltage is controlled to be greater than or equal to a first threshold voltage when the first switch transistor is turned on, such that the supply voltage or the supply current satisfies a drive voltage of the first switch transistor and an operating voltage of a to-be-powered circuit of the switched-mode power supply.

20 Claims, 5 Drawing Sheets

SWITCHED-MODE POWER SUPPLY, POWER SUPPLY CIRCUIT THEREOF, AND POWER SUPPLY METHOD

CROSS REFERENCE TO THE RELATED APPLICATIONS

This application is based upon and claims priority to Chinese Patent Application No. 202111283870.0, filed on Nov. 1, 2021, the entire contents of which are incorporated herein by reference.

TECHNICAL FIELD

The present disclosure relates to the field of power electronics technology, and in particular, to a switched-mode power supply, power supply circuit thereof, and a power supply method.

BACKGROUND

In the prior art, a power supply capacitor needs to be disposed on the periphery of a chip of a switched-mode power supply. One terminal of the power supply capacitor is connected to a reference ground of the chip, and the other terminal is charged by the voltage input of the switched-mode power supply to store some charges. The stored charges provide an operating voltage for the internal control logic of the chip and a drive current for a switch transistor to ensure stable operation of the chip and prevent the chip from shutting down or malfunctioning due to insufficient power supply. In addition to space occupation, the power supply capacitor on the periphery of the chip leads to increased material costs, longer processing cycle, higher processing costs, and lower system reliability of the switched-mode power supply due to competitive market conditions, limited semiconductor production capacity, and increased device material costs.

SUMMARY

Given this, the purpose of the present disclosure is to provide a switched-mode power supply, a power supply circuit thereof, and a power supply method to resolve technical problems that devices on the periphery of the chip occupy space and lead to increased costs and lower system reliability.

To resolve the above technical problems, the present disclosure provides a power supply circuit of a switched-mode power supply. The switched-mode power supply includes a first switch transistor, a drain of the first switch transistor that receives an input voltage on a direct current input bus of the switched-mode power supply, and a source connected to a reference ground. The power supply circuit includes:

a junction field-effect transistor (JFET), where a drain of the JFET receives the input voltage, a gate connected to the reference ground, and a source that outputs a supply voltage or a supply current.

During each switch cycle, the first switch transistor is controlled to be turned off or a drain voltage is controlled to be greater than or equal to a first threshold voltage when the first switch transistor is turned on, such that the supply voltage or the supply current satisfies a drive voltage of the first switch transistor and an operating voltage of a to-be-powered circuit of the switched-mode power supply.

Optionally, the JFET is turned on.

Optionally, the power supply circuit includes a first voltage generation unit and a second voltage generation unit.

An input terminal of the first voltage generation unit is connected to the JFET to output a first voltage, and the first voltage is used as the drive voltage of the first switch transistor to control the drain voltage to be greater than or equal to the first threshold voltage when the first switch transistor is turned on.

An input terminal of the second voltage generation unit is connected to the source of the JFET or the first voltage generation unit to output a second voltage, and the second voltage is used as the operating voltage of the to-be-powered circuit.

If the drain voltage is equal to the first threshold voltage when the first switch transistor is turned on, the first voltage reaches a minimum voltage capable of driving the first switch transistor or the second voltage reaches a minimum operating voltage at which the to-be-powered circuit can operate properly.

Optionally, the first voltage generation unit includes a gate-source capacitor of the first switch transistor and
 a gate of the first switch transistor that is connected to the source of the JFET, and the gate-source capacitor receives the supply current to generate the first voltage.

Optionally, the first voltage generation unit includes:
 a step-down circuit provided with an input terminal connected to the source of the JFET and an output terminal connected to a gate of the first switch transistor, where a first voltage drop is controlled between the source of the JFET and the gate of the first switch transistor when the first switch transistor is turned on; and
 a gate-source capacitor of the first switch transistor, where the gate-source capacitor receives the supply current to generate the first voltage.

Optionally, the input terminal of the second voltage generation unit is connected to the output terminal of the step-down circuit.

Optionally, the first voltage generation unit includes:
 an input voltage detection and control unit configured to receive the input voltage to obtain an input voltage feedback signal and output a first error voltage based on the input voltage feedback signal and a first reference voltage; and
 an adjustment unit configured to receive the supply voltage and the first error voltage to output the first voltage.

Optionally, the adjustment unit includes an adder, and the adder performs an addition operation on the supply voltage and the first error voltage to output the first voltage.

Optionally, the second voltage is used as the operating voltage of the first voltage generation unit.

According to a second aspect, the present disclosure provides a switched-mode power supply, including the power supply circuit, a first switch transistor, a switch control circuit, and a drive circuit. A drain of the first switch transistor receives an input voltage on a direct current input bus of the switched-mode power supply.

The switch control circuit samples the switched-mode power supply to obtain an inductor current sampling signal. The switch control circuit also receives an output voltage feedback signal characterizing information about the output voltage of the switched-mode power supply and obtains a switch control signal based on the inductor current sampling signal and the output voltage feedback signal.

The drive circuit receives the switch control signal and disconnects or connects a path for supplying a drive voltage to the first switch transistor based on the switch control signal.

The power supply circuit generates a first voltage as the drive voltage of the first switch transistor to control the drain voltage when the first switch transistor is turned on, and the power supply circuit generates a second voltage as an operating voltage of the switch control circuit.

Optionally, the switch control circuit includes:
an inductor current detection unit configured to sample from the switched-mode power supply and obtain a current flowing through the first switch transistor when the first switch transistor is turned on to output the inductor current sampling signal;
an output voltage detection and holding unit configured to receive, when the first switch transistor is turned off, the output voltage feedback signal characterizing the output voltage of the switched-mode power supply to output an output voltage sampling signal; and
a logic control unit configured to receive the inductor current sampling signal and the output voltage sampling signal to generate the switch control signal.

Optionally, the current detection circuit includes:
a first sampling resistor provided with a first terminal connected to a source of the first switch transistor and a second terminal connected to a reference ground, where the first terminal of the first sampling resistor is used as an output terminal of the current detection circuit to output the inductor current sampling signal.

Optionally, the current detection circuit includes:
a second switch transistor provided with a gate connected to a gate of the first switch transistor and a drain connected to the drain of the first switch transistor; and
a second sampling resistor provided with a first terminal connected to a source of the second switch transistor and a second terminal connected to the source of the first switch transistor and connected to the reference ground, where the first terminal of the second sampling resistor is used as an output terminal of the current detection circuit to output the inductor current sampling signal.

Optionally, the switched-mode power supply further includes:
an output voltage transmission circuit configured to receive the output voltage of the switched-mode power supply to output the output voltage feedback signal.

Optionally, at least some of the components of the power supply circuit, the first switch transistor, the switch control circuit, and the drive circuit are integrated into the same integrated chip.

Optionally, at least some of the components of the power supply circuit, the first switch transistor, the switch control circuit, the drive circuit, and the output voltage transmission circuit are integrated into the same integrated chip.

According to a third aspect, the present disclosure provides a power supply method of a switched-mode power supply. The switched-mode power supply includes a first switch transistor, a drain of the first switch transistor that receives an input voltage on a direct current input bus of the switched-mode power supply, and a source connected to a reference ground. The power supply method includes:
adopting a junction field-effect transistor (JFET), where a drain of the JFET receives the input voltage, a gate is connected to the reference ground, and a source outputs a supply voltage or a supply current; and
during each switch cycle, controlling the first switch transistor to be turned off or controlling a drain voltage to be greater than or equal to a first threshold voltage when the first switch transistor is turned on, such that the supply voltage or the supply current satisfies a drive voltage of the first switch transistor and an operating voltage of a to-be-powered circuit of the switched-mode power supply.

Optionally, the power supply method further includes:
obtaining a first voltage and a second voltage based on the supply voltage or the supply current, where the first voltage is used as the drive voltage of the first switch transistor to control the drain voltage to be greater than or equal to the first threshold voltage when the first switch transistor is turned on and the second voltage is used as the operating voltage of the to-be-powered circuit; and
if the drain voltage is equal to the first threshold voltage when the first switch transistor is turned on, the first voltage reaches a minimum voltage capable of driving the first switch transistor or the second voltage reaches a minimum operating voltage at which the to-be-powered circuit can operate properly.

Compared with the prior art, the technical solution of the present disclosure has the following advantages: The switched-mode power supply, power supply circuit thereof, and the power supply method provided in the present disclosure do not require peripheral power supply capacitors. In this way, the chip of the switched-mode power supply has few peripheral devices, low costs, and high reliability.

DETAILED DESCRIPTION OF THE EMBODIMENTS

The preferred embodiments of the present disclosure are described in detail below with reference to the drawings, but the present disclosure is not limited to these embodiments. The present disclosure covers any substitutions, modifications, equivalent methods, and solutions made within the spirit and scope of the present disclosure.

For a better understanding of the present disclosure, the specific details of the following preferred embodiments of the present disclosure are explained hereinafter in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are merely for the objectives of conveniently and assisting in clearly illustrating the embodiments of the present disclosure.

Figure 1:
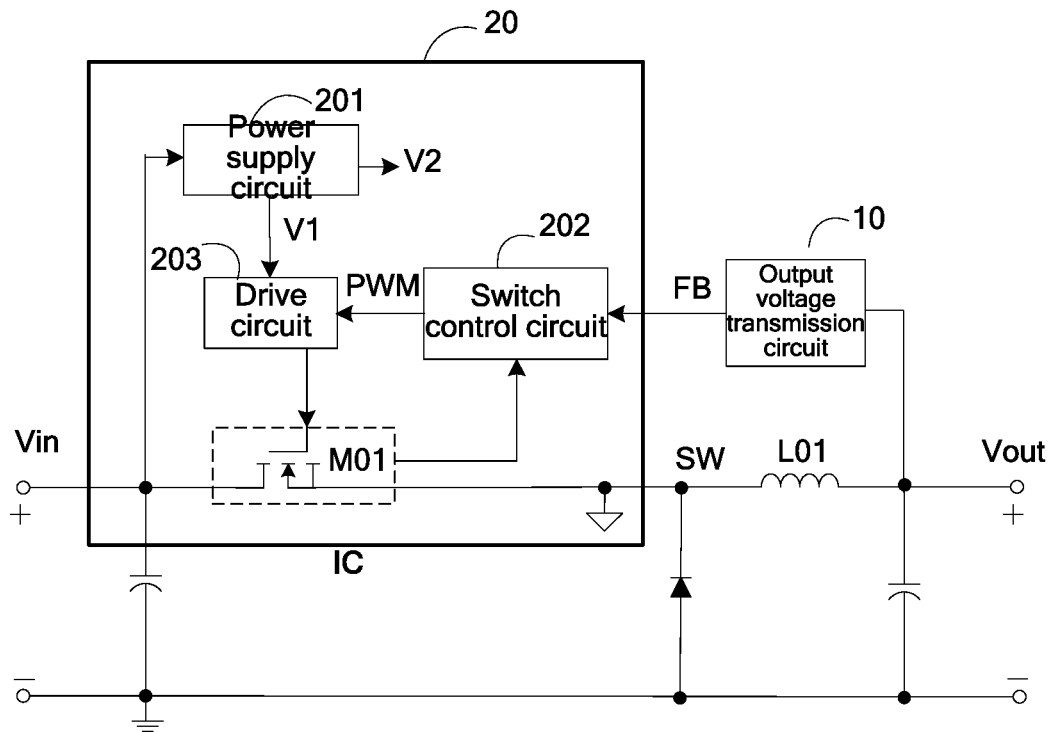
FIG. 1 is a schematic principle diagram of a circuit of a switched-mode power supply according to the present disclosure.

FIG. 1 is a schematic principle diagram of a circuit of a switched-mode power supply according to the present disclosure. The switched-mode power supply includes first switch transistor M01, power supply circuit 201, switch control circuit 202, drive circuit 203, and output voltage transmission circuit 10. A drain of the first switch transistor M01 receives an input voltage Vin on a direct current input bus of the switched-mode power supply, and a source is connected to a switch (SW) node. The power supply circuit 201 receives the input voltage Vin to generate first voltage V1 and second voltage V2. The first voltage V1 is used as a drive voltage of the first switch transistor M01 to control a drain voltage when the first switch transistor M01 is turned on, and the second voltage V2 is used as an operating voltage of a to-be-powered circuit of the switched-mode power supply. The to-be-powered circuit includes the switch control circuit 202 and may further include a part of the power supply circuit 201 in some embodiments. The switch control circuit 202 samples from the switched-mode power supply to obtain an inductor current sampling signal, receives output voltage feedback signal FB characterizing information about an output voltage of the switched-mode power supply, and obtains switch control signal PWM based on the inductor current sampling signal and the output voltage feedback signal FB. The drive circuit 203 receives the switch control signal PWM, and disconnects or connects a path for supplying the drive voltage to the first switch transistor based on the switch control signal PWM. When the switch control signal PWM characterizes that the first switch transistor M01 needs to be turned off, the drive circuit 203 disconnects the path for supplying the drive voltage to the first switch transistor M01. When the switch control signal PWM characterizes that the first switch transistor M01 needs to be turned on, the drive circuit 203 connects the path for supplying the drive voltage to the first switch transistor M01. The output voltage transmission circuit 10 receives the output voltage Vout of the switched-mode power supply to output the output voltage feedback signal FB.

In an embodiment, the first switch transistor M01, the power supply circuit 201, the switch control circuit 202, and the drive circuit 203 are integrated into the same integrated chip 20, and the SW node is used as a reference ground of the integrated chip 20. The power supply circuit 201 supplies power to the integrated chip 20, such that the integrated chip 20 does not need to be powered by a peripheral power supply capacitor. In another embodiment, the first switch transistor M01, the power supply circuit 201, a part of the switch control circuit 202, and the drive circuit 203 may be integrated into the same integrated chip. In a first example, the power supply circuit 201, the whole or a part of the switch control circuit 202, and the drive circuit 203 may be integrated into the same integrated chip. In a second example, the whole or a part of the output voltage transmission circuit 10, the first switch transistor M01, the power supply circuit 201, the whole or a part of the switch control circuit 202, and the drive circuit 203 may be integrated into the same integrated chip. In a third example, the whole or a part of the output voltage transmission circuit 10, the power supply circuit 201, the whole or a part of the switch control circuit 202, and the drive circuit 203 may be integrated into the same integrated chip. In an embodiment, the output voltage transmission circuit 10 includes a diode, where an anode of the diode receives the output voltage Vout of the switched-mode power supply and a cathode of the diode outputs the output voltage feedback signal FB. The diode may or may not be integrated into the integrated chip. In another embodiment, the output voltage transmission circuit 10 includes an upper voltage divider resistor and a lower voltage divider resistor connected in series between the output terminal of the switched-mode power supply and the ground. A common terminal of the upper voltage divider resistor and the lower voltage divider resistor outputs the output voltage feedback signal FB, the other terminal of the upper voltage divider resistor is connected to the output terminal of the switched-mode power supply to receive the output voltage Vout, and the other terminal of the lower voltage divider resistor is grounded. The upper voltage divider resistor may or may not be integrated into the integrated chip.

Alternatively, in another embodiment, the switched-mode power supply may not include the output voltage transmission circuit 10, and the output voltage Vout of the switched-mode power supply is directly used as the output voltage feedback signal FB to further be used as an input signal to the switch control circuit 202.

Figure 2:
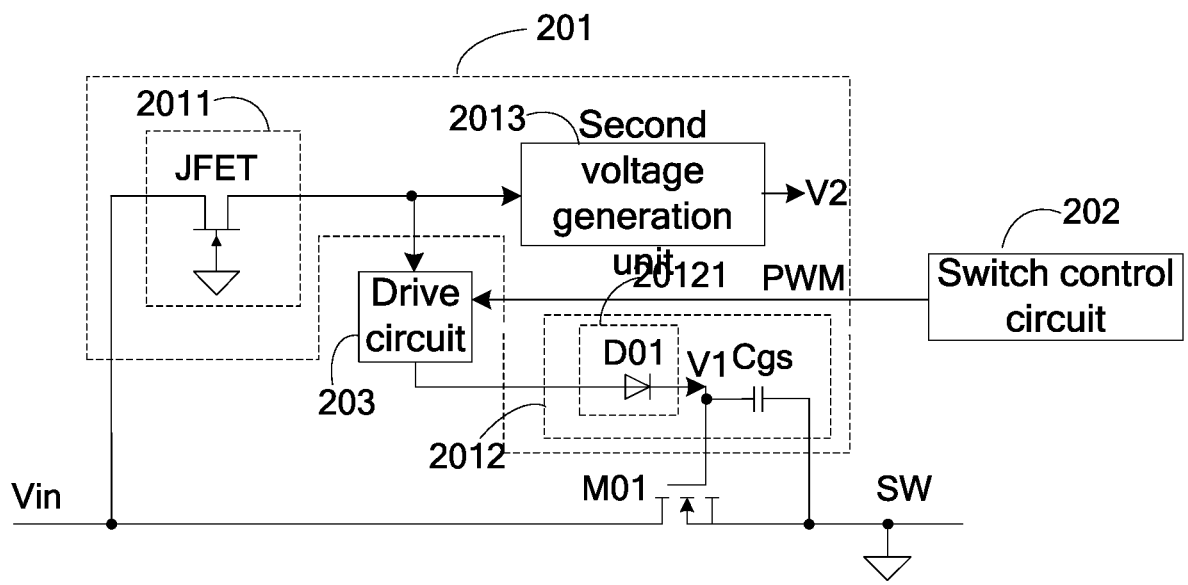
FIG. 2 is a schematic structural diagram of a circuit of a switched-mode power supply according to Embodiment 1 of the present disclosure.

FIG. 2 is a schematic structural diagram of a circuit of a switched-mode power supply according to Embodiment 1 of the present disclosure. This embodiment of power supply circuit 201 includes junction field-effect transistor 2011, first voltage generation unit 2012, and second voltage generation unit 2013. A drain of the JFET 2011 receives an input voltage Vin on a direct current input bus of the switched-mode power supply, a gate is connected to a reference ground, and a source outputs a supply voltage or a supply current. An input terminal of the first voltage generation unit 2012 is connected to the source of the JFET via drive circuit 203 to output first voltage V1, and the first voltage V1 is used as a drive voltage of first switch transistor M01. The drive circuit 203 receives switch control signal PWM output from switch control circuit 202 and disconnects or connects a path for supplying the drive voltage to the first switch transistor based on the switch control signal PWM. An input terminal of the second voltage generation unit 2013 is connected to the source of the JFET 2011 to output second voltage V2, and the second voltage V2 is used as an operating voltage of the switch control circuit 202. Further, the first voltage generation unit 2012 includes gate-source capacitor Cgs of the first switch transistor and step-down circuit 20121. In this embodiment, the drive circuit 203 and the step-down circuit 20121 are connected in series between the input terminal of the second voltage generation unit 2013 and the gate of the first switch transistor M01. The input terminal of the second voltage generation unit 2013 is connected to the source of the JFET 2011, such that when the drive circuit 203 connects the path for supplying the drive voltage to the first switch transistor, an input terminal of the step-down circuit 20121 is connected to the source of the JFET 2011 through the drive circuit 203 and the output terminal is connected to the gate of the first switch transistor M01. In an embodiment, as shown in FIG. 2, a first terminal of the drive circuit 203 and the input terminal of the second voltage generation unit 2013 are both connected to the source of the JFET 2011, a second terminal of the drive circuit 203 is connected to the input terminal of the step-down circuit 20121, and the output terminal of the step-down circuit 20121 is connected to the gate of the first switch transistor M01. For example, the step-down circuit 20121 includes first diode D01, an anode of the first diode D01 is connected to the second terminal of the drive circuit 203 and a cathode of the first diode D01 is connected to the gate of the first switch transistor M01, and the first diode D01 has a forward voltage drop Vf. In another embodiment, the positions of the drive circuit 203 and the step-down circuit 20121 may alternatively be swapped, to be specific, the input terminal of the step-down circuit 20121 and the input terminal of the second voltage generation unit 2013 are both connected to the source of the JFET 2011, the output terminal of the step-down circuit 20121 is connected to the first terminal of the drive circuit 203, and the second terminal of the drive circuit 203 is connected to the gate of the first switch transistor M01. When the drive circuit 203 connects the path for supplying the drive voltage to the first switch transistor, the step-down circuit 20121 controls a first voltage drop Vf between the source of the JFET and the gate of the first switch transistor.

When the first switch transistor M01 is turned on, the gate-source capacitor Cgs receives the supply current output from the source of the JFET 2011 to output the first voltage V1 as the drive voltage of the first switch transistor M01. In this case, the gate voltage of the first switch transistor M01 is the first voltage V1, and correspondingly, the source voltage of the JFET 2011 is V1+Vf. The second voltage generation unit 2013 receives the supply voltage V1+Vf output from the JFET 2011 to generate second voltage V2. In each switching cycle, the first switch transistor M01 experiences two types of turn-off periods. The first one is a period during which the drive circuit 203 disconnects the path for supplying the drive voltage to the first switch transistor, and the second type is a period from a moment at which the drive circuit 203 starts connecting the path for supplying the drive voltage to the first switch transistor to a moment at which the first switch transistor is turned on. During the first type of turn-off period, the JFET 2011 outputs the supply current for supplying to the second voltage generation unit 2013 to generate the second voltage V2. During the second type of turn-off period, a part of the supply current output by the JFET 2011 is provided to the second voltage generation unit 2013 to generate the second voltage V2, and another part of the supply current is used as a drive current of the first switch transistor M01.

Parameters such as the capacitance of the gate-source capacitor Cgs and the value of the first voltage drop Vf may be set to adjust and optimize the first voltage V1 and the second voltage V2 to ensure that the first voltage V1 can properly drive the first switch transistor M01, and the second voltage V2 enables the switch control circuit 202 to operate properly. For example, the gate-source capacitor Cgs with appropriate capacitance can be obtained by designing a corresponding size or a relevant process condition of the first switch transistor M01, the step-down circuit 20121 is disposed to obtain the first voltage drop Vf of an appropriate voltage value, and the first voltage V1 is adjusted and optimized, such that the first voltage V1 controls the drain voltage to be greater than or equal to the first threshold voltage V11 when the first switch transistor M01 is turned on. If the drain voltage is equal to the first threshold voltage V11 when the first switch transistor M01 is turned on, the first voltage V1 reaches a minimum voltage capable of driving the first switch transistor M01 or the second voltage V2 reaches a minimum operating voltage at which the switch control circuit 202 can operate properly.

The power supply circuit in the switched-mode power supply in this embodiment provides the drive voltage of the first switch transistor and provides the operating voltage of the switch control circuit. In addition, the power supply circuit makes use of the gate-source capacitor parasitizing the first switch transistor, thus the circuit structure is simple. This solution is suitable for a switched-mode power supply with a small quiescent current (for example, the quiescent current is below 100 uA) and a smaller peak current of the first switch transistor M01, such as a high-voltage step-down switched-mode power supply like low-power ACDC off-line. This type of switched-mode power supply has low output voltage (usually 5 V/12 V) and thus small duty cycles; the turn-on time of the first switch transistor M01 is short (usually less than 1 us), thus the gate-source capacitor Cgs of the first switch transistor M01 only supplies power for a short period of time and basic operation can be achieved. The switched-mode power supply in this embodiment has a simple circuit structure, and the chip of the switched-mode power supply does not require peripheral power supply capacitors. In this way, the chip of the switched-mode power supply has few peripheral devices, low costs, and high reliability.

Figure 3:
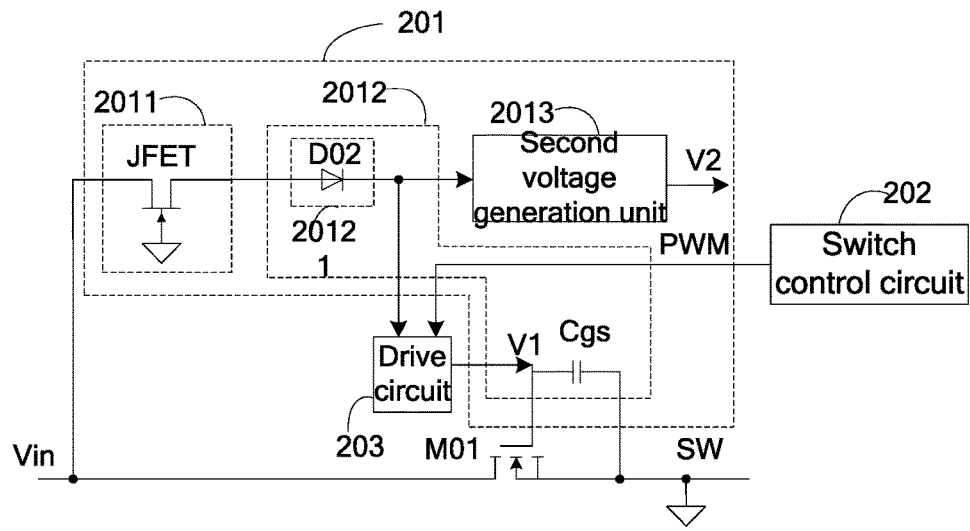
FIG. 3 is a schematic structural diagram of a circuit of a switched-mode power supply according to Embodiment 2 of the present disclosure.

FIG. 3 is a schematic structural diagram of a circuit of a switched-mode power supply according to Embodiment 2 of the present disclosure. The circuit structure of this embodiment is basically the same as that of Embodiment 1, and details are not described herein again. The difference is that in Embodiment 1, the drive circuit 203 and the step-down circuit 20121 are connected in series between the input terminal of the second voltage generation unit 2013 and the gate of the first switch transistor M01, while in this embodiment, only the drive circuit 203 is connected between the input terminal of the second voltage generation unit 2013 and the gate of the first switch transistor M01. In an embodiment, there is a step-down circuit 20121. Referring to FIG. 3, an input terminal of the step-down circuit 20121 is connected to the source of the JFET 2011, and an output terminal is connected to the input terminal of the second voltage generation unit 2013. For example, the step-down circuit 20121 includes second diode D02, an anode of the second diode D02 is connected to the source of the JFET 2011 and a cathode of the second diode D02 is connected to the output terminal of the step-down circuit 20121, and the second diode D02 has a forward voltage drop Vf. In another embodiment, there may be no step-down circuit 20121, the input terminal of the second voltage generation unit 2013 is connected to the source of the JFET 2011, and only the drive circuit 203 is connected between the source of the JFET 2011 and the gate of the first switch transistor.

When the first switch transistor M01 is turned on, the gate-source capacitor Cgs receives the current output by the JFET 2011 to output the first voltage V1 as the drive voltage of the first switch transistor M01. In addition, the gate-source capacitor Cgs is also used as a power supply capacitor providing the input voltage of the second voltage generation unit 2013. The second voltage generation unit 2013 outputs the second voltage V2 as the operating voltage of the switch control circuit 202 to support the normal operation of the switch control circuit 202. The gate voltage of the first switch transistor M01 during this period is the first voltage V1. In an embodiment that the step-down circuit 20121 exists, there is a first voltage drop Vf between the source of the JFET 2011 and the gate of the first switch transistor M01, such that the source voltage of the JFET 2011 is V1+Vf. In another embodiment where the step-down circuit 20121 does not exist, the source voltage of the JFET 2011 is V1. When the first switch transistor M01 is turned off, the operation principle of this embodiment is the same as that of Embodiment 1, and details are not described herein again.

Parameters such as the capacitance of the gate-source capacitor Cgs and the value of the first voltage drop Vf may be set to adjust and optimize the first voltage V1 and the second voltage V2 to ensure that the first voltage V1 can properly drive the first switch transistor M01, and the second voltage V2 enables the switch control circuit 202 to operate properly. For example, the gate-source capacitor Cgs with appropriate capacitance can be obtained by designing a corresponding size or a relevant process condition of the first switch transistor M01, the step-down circuit 20121 is disposed to obtain the first voltage drop Vf of an appropriate voltage value, and the first voltage V1 is adjusted and optimized, such that the first voltage V1 controls the drain voltage to be greater than or equal to the first threshold voltage V11 when the first switch transistor M01 is turned on. If the drain voltage is equal to the first threshold voltage V11 when the first switch transistor M01 is turned on, the first voltage V1 reaches a minimum voltage capable of driving the first switch transistor M01 or the second voltage V2 reaches a minimum operating voltage at which the switch control circuit 202 can operate properly.

The power supply circuit in the switched-mode power supply in this embodiment provides the drive voltage of the first switch transistor and provides the operating voltage of the switch control circuit. When the first switch transistor is turned on, the gate-source capacitor serves as the power supply capacitor providing the drive voltage of the first switch transistor and supporting the normal operation of the switch control circuit. Thus, the circuit structure of the power supply circuit is simple. This embodiment is suitable for a switched-mode power supply with a small quiescent current (for example, iq is below 100 uA) and a smaller peak current of the first switch transistor M01, such as a high-voltage step-down switched-mode power supply like low-power ACDC off-line. This type of switched-mode power supply has low output voltage (usually 5 V/12 V) and thus small duty cycles; the turn-on time of the first switch transistor M01 is short (usually less than 1 us), thus the gate-source capacitor Cgs of the first switch transistor M01 only supplies power for a short period of time and basic operation can be achieved. The switched-mode power supply in this embodiment has a simple circuit structure, and the chip of the switched-mode power supply does not require peripheral power supply capacitors. In this way, the chip of the switched-mode power supply has few peripheral devices, low costs, and high reliability.

Figure 4:
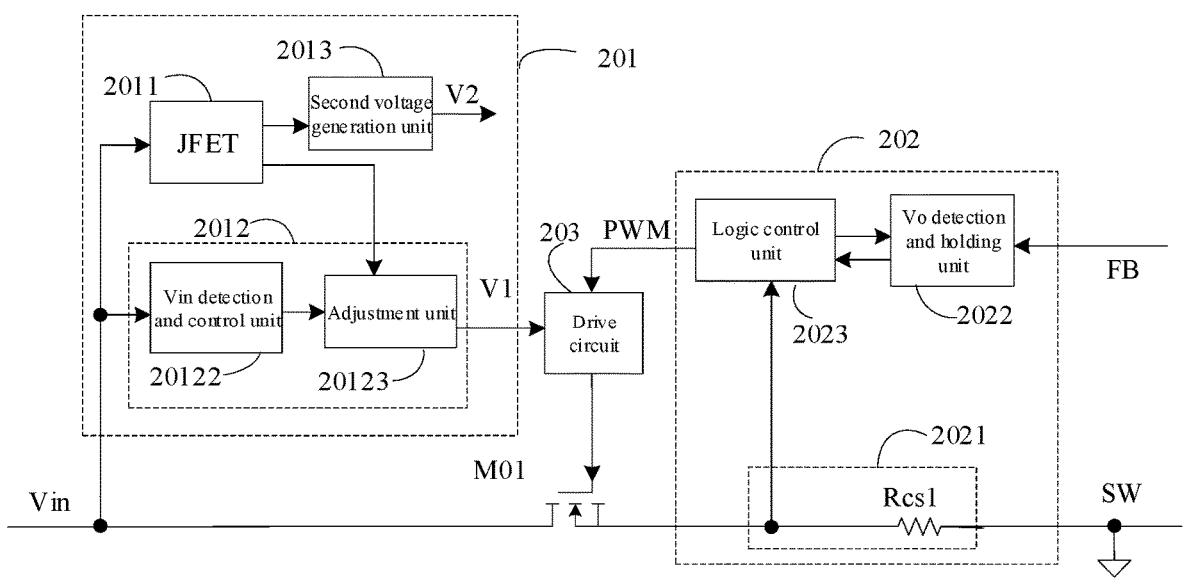
FIG. 4 is a schematic structural diagram of a circuit of a switched-mode power supply according to Embodiment 3 of the present disclosure.

Referring to FIG. 4, power supply circuit 201 according to Embodiment 3 of the present disclosure includes junction field-effect transistor 2011, first voltage generation unit 2012, and second voltage generation unit 2013. A drain of the JFET 2011 receives an input voltage Vin on a direct current input bus of the switched-mode power supply, a gate is connected to a reference ground, and a source outputs a supply voltage or a supply current. The first voltage generation unit 2012 includes input voltage detection and control unit 20122 and adjustment unit 20123. The input voltage detection and control unit 20122 receives the input voltage Vin to output a first error voltage. The adjustment unit 20123 receives the supply voltage and the first error voltage to output the first voltage V1. An input terminal of the second voltage generation unit 2013 is connected to the source of the JFET to output second voltage V2. The switch control circuit 202 includes inductor current detection unit 2021, output voltage detection and holding unit 2022, and logic control unit 2023. The inductor current detection unit 2021 samples from the switched-mode power supply and obtains a current flowing through the first switch transistor when the first switch transistor is turned on to output an inductor current sampling signal. The output voltage detection and holding unit 2022 receives, when the first switch transistor is turned off, an output voltage feedback signal FB characterizing an output voltage of the switched-mode power supply to output an output voltage sampling signal. The logic control unit 2023 receives the inductor current sampling signal and the output voltage sampling signal to generate a switch control signal PWM. For example, the logic control unit 2023 controls an operating frequency peak current based on the inductor current sampling signal and the output voltage sampling signal. The drive circuit 203 receives the switch control signal PWM and disconnects or connects a path for supplying the first voltage V1 to the first switch transistor based on the switch control signal PWM. Further, in this embodiment, the inductor current detection unit 2021 includes first sampling resistor Rcs1, where the first terminal of the first sampling resistor Rcs1 is connected to a source of the first switch transistor and the second terminal of the first sampling resistor Rcs1 is connected to the reference ground. The first terminal of the first sampling resistor Rcs1 is used as an output terminal of the inductor current detection unit 2021 to output the inductor current sampling signal.

Figure 5:
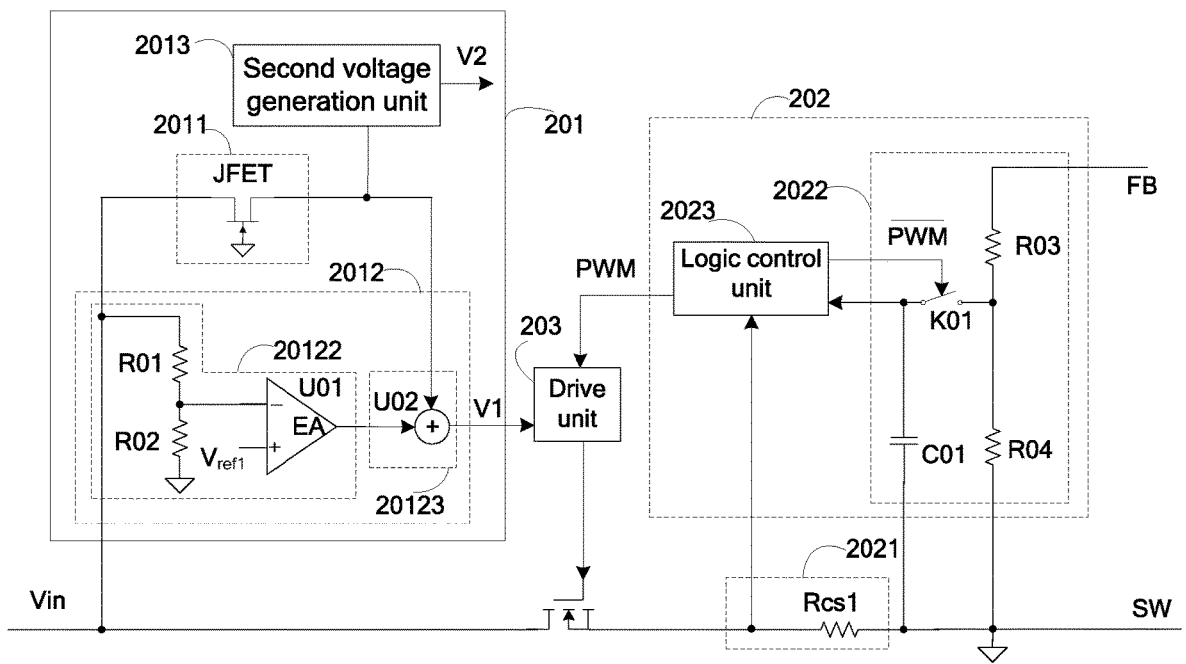
FIG. 5 is a schematic structural diagram of a circuit example of the switched-mode power supply in FIG. 4.

For example, referring to FIG. 5, a specific circuit of the input voltage detection and control unit 20122 includes first resistor R01, second resistor R02, and error amplifier U01. The first resistor R01 and the second resistor R02 are connected in series between the direct current input bus of the switched-mode power supply and the reference ground, and a common terminal of both the first resistor R01 and the second resistor R02 outputs an input voltage feedback signal, the other terminal of the first resistor R01 receives the input voltage Vin, and the other terminal of the second resistor R02 is connected to the reference ground. A first input terminal of the error amplifier U01 receives the input voltage feedback signal, and a second input terminal receives first reference voltage Vref1. A difference between the input voltage feedback signal and the first reference voltage is amplified to output a first error voltage. The adjustment unit 20123 includes an adder, and the adder performs an addition operation on the supply voltage and the first error voltage to output the first voltage V1. A specific circuit of the output voltage detection and holding unit 2022 includes third resistor R03, fourth resistor R04, first switch K01, and first capacitor C01. The third resistor R03 and the fourth resistor R04 are connected in series, and the other terminal of the third resistor R03 receives the output voltage feedback signal FB, and the other terminal of the fourth resistor R04 is connected to the reference ground. A first terminal of the first switch K01 is connected to a common terminal of the third resistor R03 and the fourth resistor R04, a second terminal of the first switch K01 is connected to a first terminal of the first capacitor C01, and a second terminal of the first capacitor C01 is connected to the reference ground. A control terminal of the first switch K01 receives a non-signal $\overline{\text{PWM}}$ of the switch control signal generated by the logic control unit 2023. When the first switch transistor M01 is turned off, the first switch K01 is turned on; when the first switch transistor M01 is turned on, the first switch K01 is turned off. The first capacitor C01 acts as a filter, such that when the first switch transistor M01 is turned on, the voltage at the second terminal of the first switch K01 can also be maintained at the voltage sampled in the turn-off period of the first switch transistor M01. The third resistor R03 in the output voltage detection and holding unit 2022 may or may not be integrated into the integrated chip as described above.

In this embodiment, the first voltage V1 generated by the power supply circuit 201 provides the drive voltage when the first switch transistor M01 is turned on, and the second voltage V2 generated by the power supply circuit 201 is used as the operating voltage of the switch control circuit 202 and also as the operating voltage of the first voltage generation unit 2012. The first voltage V1 is set to enable the drain voltage to be greater than or equal to the first threshold voltage V11 when the first switch transistor M01 is turned on. If the drain voltage is equal to the first threshold voltage V11 when the first switch transistor M01 is turned on, the first voltage V1 reaches a minimum voltage capable of driving the first switch transistor or the second voltage V2 reaches a minimum operating voltage at which the switch control circuit 202 and the first voltage generation unit 2012 can operate properly. For example, when the first switch transistor M01 is turned on, the first voltage V1 may be set to control the gate to source voltage Vgs to be greater than a threshold voltage Vgsth by a certain margin when the first switch transistor M01 is turned on, for example, Vgs≥Vgsth+ΔV, and control the drain voltage Vd to be greater than or equal to the first threshold voltage V11 when the first switch transistor M01 is turned on. ΔV may be set based on the desired value of a drain to source current $i_{ds}$ of the first switch transistor M01, the resistance of the first sampling resistor Rcs1, and other parameters.

Figure 6:
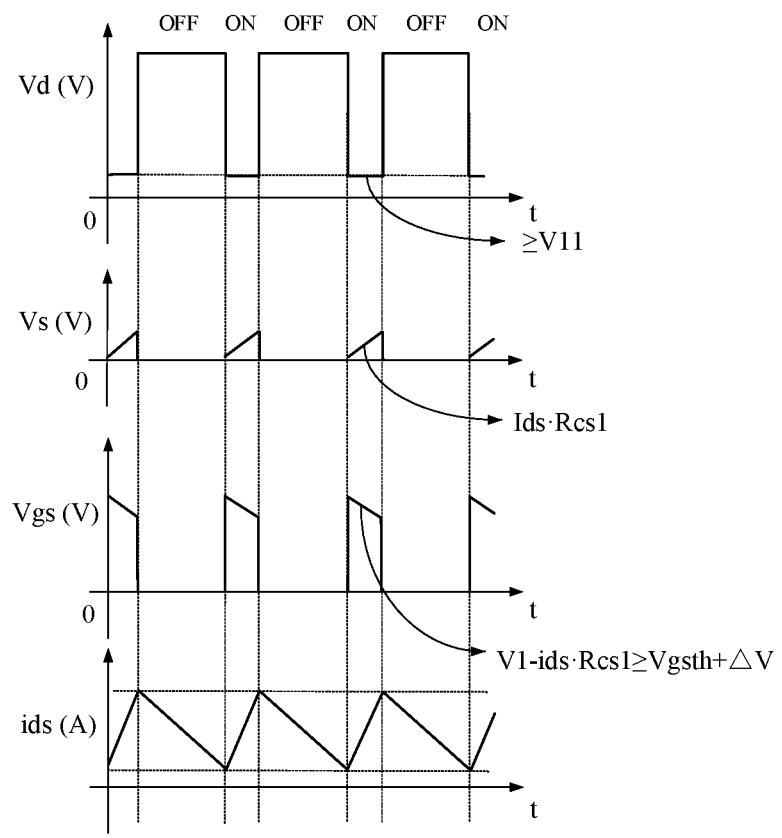
FIG. 6 is a schematic diagram of a waveform of a first switch transistor in FIG. 4.

FIG. 6 is a schematic diagram of a waveform of the first switch transistor M01 in FIG. 4. The drain voltage Vd is greater than or equal to the first threshold voltage V11 when the first switch transistor M01 is turned on. When the first switch transistor M01 is turned on, the drain to source current $i_{ds}$ of the first switch transistor M01 increases, and accordingly the current flowing through the first sampling resistor Rcs1 increases, which may cause the voltage Vcs of the first sampling resistor to increase, leading to an increase in the source voltage Vs and a decrease in the gate to source voltage Vgs of the first switch transistor M01. In this case, the gate to source voltage Vgs is not sufficient, and the drain to source current $i_{ds}$ of the first switch transistor M01 gets saturated. The voltage of the first sampling resistor is Vcs=$i_{ds}$·Rcs1, the source voltage of the first switch transistor M01 is Vs=Vcs=$i_{ds}$·Rcs1, and the gate to source voltage is Vgs=V1−$i_{ds}$·Rcs1. Therefore, when the first sampling resistor Rcs1 exists, the drain to source voltage Vds of the first switch transistor M01 needs to be controlled to be relatively high, such that the magnitude of the gate to source voltage Vgs of the first switch transistor M01 meets the requirement.

The power supply circuit in the switched-mode power supply in this embodiment provides the drive voltage of the first switch transistor and provides the operating voltage of the switch control circuit. Compared with Embodiment 1 and Embodiment 2, the switched-mode power supply in this embodiment is suitable for a switched-mode power supply with a larger quiescent current and a larger peak current of the first switch transistor M01. The switched-mode power supply in this embodiment is more suitable for high-voltage step-down switched-mode power supply and is also suitable for any switched-mode power supply with a stable output voltage. The chip of the switched-mode power supply in this embodiment does not require peripheral power supply capacitors. In this way, the chip of the switched-mode power supply has few peripheral devices, low costs, and high reliability.

Figure 7:
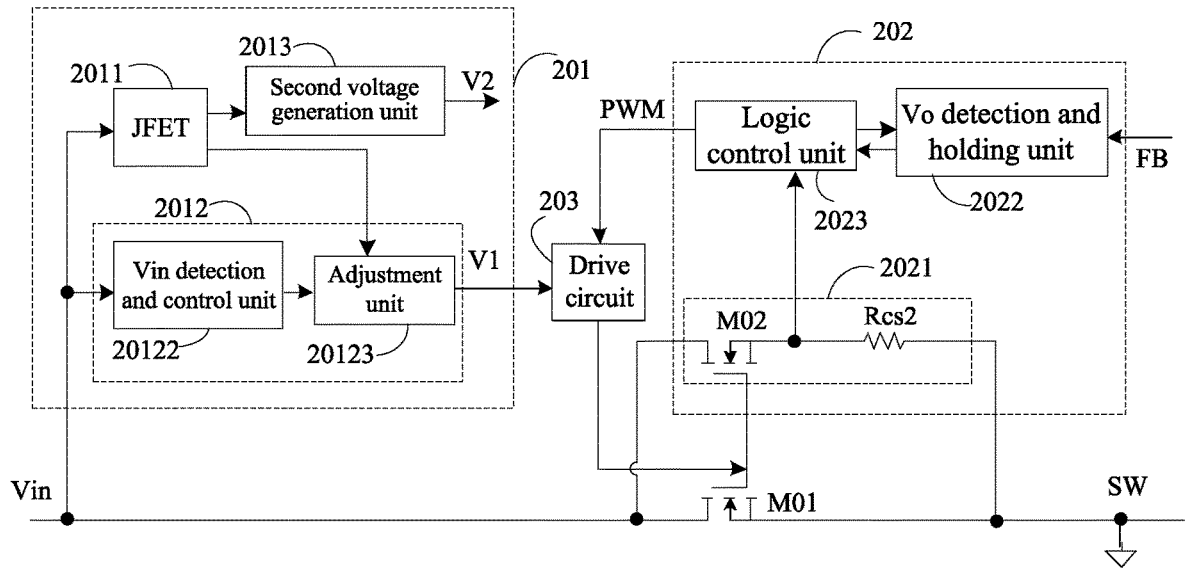
FIG. 7 is a schematic structural diagram of a circuit of a switched-mode power supply according to Embodiment 4 of the present disclosure.

FIG. 7 is a schematic structural diagram of a circuit of a switched-mode power supply according to Embodiment 4 of the present disclosure. The circuit structure of this embodiment is basically the same as that of Embodiment 3, and details are not described again herein. The difference is that the inductor current detection unit 2021 of this embodiment includes second switch transistor M02 and second sampling resistor Rcs2, where a gate of the second switch transistor M02 is connected to the gate of the first switch transistor M01 and a drain is connected to the drain of the first switch transistor M01. A first terminal of the second sampling resistor Rcs2 is connected to a source of the second switch transistor M02, a terminal end is connected to the source of the first switch transistor M01 and connected to the reference ground. The first terminal of the second sampling resistor Rcs2 is used as an output terminal of the current detection circuit to output the inductor current sampling signal. This embodiment uses the mirroring second switch transistor M02 connected in parallel with the first switch transistor M01 and samples the current flowing through the second switch transistor M02, achieving lower losses and avoiding the effect brought by the first sampling resistor Rcs1 in Embodiment 1.

Figure 8:
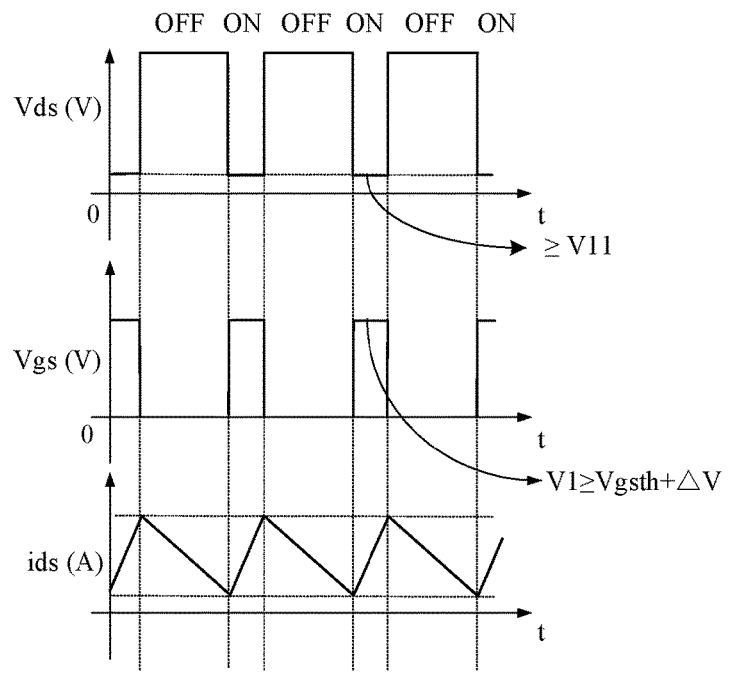
FIG. 8 is a schematic diagram of a waveform of a first switch transistor in FIG. 7.

FIG. 8 is a schematic diagram of a waveform of the first switch transistor M01 in FIG. 7. When the first switch transistor M01 is turned on, the drain to source voltage Vds and the gate to source voltage Vgs of the first switch transistor M01 are controlled to be stable, and the stable gate to source voltage Vgs can stably drive the first switch transistor M01 to operate. Compared with Embodiment 3, in this embodiment, the drain to source voltage Vds may be controlled to be lower when the first switch transistor M01 is turned on. To be specific, in this embodiment, the first threshold voltage V11 can be set lower than the first threshold voltage V11 in Embodiment 3. Thus the first switch transistor M01 has lower turn-off losses, and the relatively high power loss caused by the sampling resistor can be avoided.

The power supply circuit in the switched-mode power supply in this embodiment provides the drive voltage of the first switch transistor and provides the operating voltage of the switch control circuit. Compared with Embodiment 3, the switched-mode power supply in this embodiment has lower losses and higher efficiency. The switched-mode power supply in this embodiment is more suitable for high-voltage step-down switched-mode power supply and is also suitable for any switched-mode power supply with a stable output voltage. The chip of the switched-mode power supply in this embodiment does not require peripheral power supply capacitors. In this way, the chip of the switched-mode power supply has few peripheral devices, low costs, and high reliability.

The embodiments described above do not constitute a limitation on the protection scope of the technical solution. Any modification, equivalent replacement, and improvement made within the spirit and principle of the above-mentioned embodiments shall fall within the scope of protection of the technical solution of the present disclosure.

What is claimed is:

1. A power supply circuit of a switched-mode power supply, wherein the switched-mode power supply comprises a first switch transistor, wherein a drain of the first switch transistor receives an input voltage on a direct current input bus of the switched-mode power supply, and a source of the first switch transistor is connected to a reference ground; and the power supply circuit comprises:
a junction field-effect transistor (JFET), wherein a drain of the JFET receives the input voltage, a gate of the JFET is connected to the reference ground, and a source of the JFET outputs a supply voltage or a supply current; and
during each switch cycle, a drain voltage is controlled to be greater than or equal to a first threshold voltage when the first switch transistor is turned on, such that the supply voltage or the supply current satisfies a drive voltage of the first switch transistor and an operating voltage of a to-be-powered circuit.

2. The power supply circuit according to claim 1, wherein the JFET is turned on.

3. The power supply circuit according to claim 1, further comprising:
a first voltage generation unit, wherein an input terminal of the first voltage generation unit is connected to the JFET to output a first voltage, and the first voltage is used as the drive voltage of the first switch transistor to control the drain voltage to be greater than or equal to the first threshold voltage when the first switch transistor is turned on; and
a second voltage generation unit, wherein an input terminal of the second voltage generation unit is connected to the source of the JFET or the first voltage generation unit to output a second voltage, and the second voltage is used as the operating voltage of the to-be-powered circuit;
wherein if the drain voltage is equal to the first threshold voltage when the first switch transistor is turned on, the first voltage reaches a voltage not less than a minimum voltage capable of driving the first switch transistor or the second voltage reaches a voltage not less than a minimum operating voltage, wherein the to-be-powered circuit operates properly at the minimum operating voltage.

4. The power supply circuit according to claim 3, wherein the first voltage generation unit comprises a gate-source capacitor of the first switch transistor; and
a gate of the first switch transistor is connected to the source of the JFET, and the gate-source capacitor receives the supply current to generate the first voltage.

5. The power supply circuit according to claim 3, wherein the first voltage generation unit comprises:
a step-down circuit, wherein an input terminal of the step-down circuit is connected to the source of the JFET, and an output terminal of the step-down circuit is connected to a gate of the first switch transistor, and wherein a first voltage drop is generated between the source of the JFET and the gate of the first switch transistor when the first switch transistor is turned on; and
a gate-source capacitor of the first switch transistor, wherein the gate-source capacitor receives the supply current to generate the first voltage.

6. The power supply circuit according to claim 5, wherein the input terminal of the second voltage generation unit is connected to the output terminal of the step-down circuit.

7. The power supply circuit according to claim 3, wherein the first voltage generation unit comprises:
an input voltage detection and control unit configured to receive the input voltage to obtain an input voltage feedback signal, and output a first error voltage based on the input voltage feedback signal and a first reference voltage; and
an adjustment unit configured to receive the supply voltage and the first error voltage to output the first voltage.

8. The power supply circuit according to claim 7, wherein the adjustment unit comprises an adder, and the adder performs an addition operation on the supply voltage and the first error voltage to output the first voltage.

9. The power supply circuit according to claim 7, wherein the second voltage is used as the operating voltage of the first voltage generation unit.

10. A switched-mode power supply, comprising the power supply circuit according to claim 1, the first switch transistor, a switch control circuit, and a drive circuit, wherein
the drain of the first switch transistor receives the input voltage on the direct current input bus of the switched-mode power supply;
the switch control circuit samples from the switched-mode power supply to obtain an inductor current sampling signal, receives an output voltage feedback signal characterizing an information about an output voltage of the switched-mode power supply, and obtains a switch control signal based on the inductor current sampling signal and the output voltage feedback signal;
the drive circuit receives the switch control signal, the state of the first switch transistor is controlled by the switch control signal; and
a first voltage generated by the power supply circuit is used as the drive voltage of the first switch transistor, and a second voltage generated by the power supply circuit is used as the operating voltage of the switch control circuit.

11. The switched-mode power supply according to claim 10, wherein the switch control circuit comprises:
an inductor current detection unit configured to sample from the switched-mode power supply and obtain a current flowing through the first switch transistor when the first switch transistor is turned on to output the inductor current sampling signal;
an output voltage detection and holding unit configured to receive, when the first switch transistor is turned off, the output voltage feedback signal characterizing the output voltage of the switched-mode power supply to output an output voltage sampling signal; and
a logic control unit configured to receive the inductor current sampling signal and the output voltage sampling signal to generate the switch control signal.

12. The switched-mode power supply according to claim 11 further comprising a current detection circuit, wherein the current detection circuit comprises:
a first sampling resistor, wherein a first terminal of the first sampling resistor is connected to the source of the first switch transistor, and a second terminal of the first sampling resistor is connected to the reference ground, wherein the first terminal of the first sampling resistor is used as an output terminal of the current detection circuit to output the inductor current sampling signal.

13. The switched-mode power supply according to claim 11 further comprising a current detection circuit, wherein the current detection circuit comprises:
a second switch transistor, wherein a gate of the second switch transistor is connected to a gate of the first switch transistor, and a drain of the second switch transistor is connected to the drain of the first switch transistor; and
a second sampling resistor, wherein a first terminal of the second sampling resistor is connected to a source of the second switch transistor, and a second terminal of the second sampling resistor is connected to the source of the first switch transistor and connected to the reference ground, wherein the first terminal of the second sampling resistor is used as an output terminal of the current detection circuit to output the inductor current sampling signal.

14. The switched-mode power supply according to claim 10, further comprising:
an output voltage transmission circuit configured to receive the output voltage of the switched-mode power supply to output the output voltage feedback signal.

15. The switched-mode power supply according to claim 14, wherein at least some of the power supply circuit, the first switch transistor, the switch control circuit, the drive circuit, and the output voltage transmission circuit are integrated into a same integrated chip.

16. The switched-mode power supply according to claim 10, wherein at least some of the power supply circuit, the first switch transistor, the switch control circuit, and the drive circuit are integrated into a same integrated chip.

17. The switched-mode power supply according to claim 10, wherein in the power supply circuit, the JFET is turned on.

18. The switched-mode power supply according to claim 10, the power supply circuit further comprising:
a first voltage generation unit, wherein an input terminal of the first voltage generation unit is connected to the JFET to output the first voltage, and the first voltage is used as the drive voltage of the first switch transistor to control the drain voltage to be greater than or equal to the first threshold voltage when the first switch transistor is turned on; and
a second voltage generation unit, wherein an input terminal of the second voltage generation unit is connected to the source of the JFET or the first voltage generation unit to output the second voltage, and the second voltage is used as the operating voltage of the to-be-powered circuit;
wherein if the drain voltage is equal to the first threshold voltage when the first switch transistor is turned on, the first voltage reaches a minimum voltage capable of driving the first switch transistor or the second voltage reaches a minimum operating voltage, wherein the to-be-powered circuit operates properly at the minimum operating voltage.

19. A power supply method of a switched-mode power supply, wherein the switched-mode power supply comprises a first switch transistor, wherein a drain of the first switch transistor receives an input voltage on a direct current input bus of the switched-mode power supply, and a source of the first switch transistor is connected to a reference ground; and the power supply method comprises:
adopting a junction field-effect transistor (JFET), wherein a drain of the JFET receives the input voltage, a gate of the JFET is connected to the reference ground, and a source of the JFET outputs a supply voltage or a supply current; and
during each switch cycle, controlling a drain voltage to be greater than or equal to a first threshold voltage when the first switch transistor is turned on, such that the supply voltage or the supply current satisfies a drive voltage of the first switch transistor and an operating voltage of a to-be-powered circuit of the switched-mode power supply.

20. The power supply method according to claim 19, further comprising:
obtaining a first voltage and a second voltage based on the supply voltage or the supply current, wherein the first voltage is used as the drive voltage of the first switch transistor to control the drain voltage to be greater than or equal to the first threshold voltage when the first switch transistor is turned on, and the second voltage is used as the operating voltage of the to-be-powered circuit;
wherein if the drain voltage is equal to the first threshold voltage when the first switch transistor is turned on, the first voltage reaches a voltage not less than a minimum voltage capable of driving the first switch transistor or the second voltage reaches a voltage not less than a minimum operating voltage, wherein the to-be-powered circuit operates properly at the minimum operating voltage.

* * * * *